Patented Apr. 12, 1927.

1,624,036

UNITED STATES PATENT OFFICE.

JOHN W. M. BUNKER, OF BELMONT, MASSACHUSETTS, ASSIGNOR TO AMERICAN PROTEIN CORPORATION, OF BOSTON, MASSACHUSETTS, A CORPORATION OF MASSACHUSETTS.

METHOD OF PRODUCING AN EDIBLE PROTEIN PRODUCT.

No Drawing. Application filed June 19, 1925. Serial No. 38,341.

The present invention relates to an improved method of treating the blood of beef creatures and more particularly to a method of this character designed for the production of an edible food product.

A method of processing the blood of beef creatures for the production of an edible protein product is disclosed in the copending application of Wescott, Serial No. 605,090, filed December 5, 1922. According to the process as outlined in this application, the blood is extracted from the animal in a manner intended to prevent contamination and rupture of red corpuscular matter and is thereafter centrifuged in order to substantially completely separate the red corpuscular matter from the clear plasma. Following this separation, the fibrin content is separated from the straw colored plasma by coagulation. The resulting product is edible and forms a valuable adjunct of various food products. It may be merchandised either in the form of a liquid serum or in a readily soluble, dried, granular form.

It is the purpose of the present invention to enhance the keeping qualities of such a product, to substantially eliminate the possibility of odor and improve the ability to form a froth or foam when whipped; in other words, to provide a product which is comparable in major part to egg albumen.

I have discovered that treatment of the straw colored serum after defibrination with a solvent of organic fats dissolves out fatty substances which may be present in the serum, together with any traces of fibrin which may remain after coagulation of the fibrin. I am enabled to accomplish this result through the use of carbon tetrachloride which dissolves the fatty substances without forming any residual by-product which is harmful from a food standpoint. The carbon tetrachloride solution may be thereafter separated from the serum and distilled in order to recover the solvent for re-use. According to the preferred form of the process, the carbon tetrachloride is added to the defibrinated serum while warm, the mixture is thoroughly stirred, and the solvent is thereafter permitted to settle for a sufficient length of time to effect a substantially complete separation.

The resulting straw colored serum, substantially freed of fibrin and fatty substances is then concentrated and finally dried by being sprayed into heated drying air, which extracts substantially all of the moisture and permits the recovery of the serum as a granular powder. This dried product is substantially odorless, will keep indefinitely, and is readily soluble in water. The beating or whipping qualities of the dried product when processed in the manner above described approximate the whipping qualities of egg white and are sufficiently good for ordinary purposes. These qualities appear to be improved by a slight heating of the solution before whipping.

In the actual practice of my improved method, I have found that the addition of approximately fifteen per cent. of carbon tetrachloride by weight is sufficient to completely remove the fatty substances normally present in the serum. The serum is preferably heated to approximately body temperature in order to facilitate the action of the solvent. After a short stirring, the moisture is allowed to stand for a considerable period in order to complete the separation of the carbon tetrachloride solution. The latter, owing to its greater specific gravity, settles to the bottom of the serum tank and may be readily withdrawn without substantial loss of solvent. Thereafter the carbon tetrachloride solution may be distilled to recover the solvent for re-use in the process. The resulting serum, substantially free from fibrin and fatty substances, is thereafter concentrated and dried as hereinbefore described.

It is believed that the presence of fatty substances in the ultimate protein product leads to the development of a disagreeable odor and in addition acts as a surface tension depressant which interferes with the whipping or foaming qualities. The deleterious effects of these substances, if present, are eliminated by my improved treatment.

I claim—

1. The method of producing an edible protein product which consists in extracting the blood from a plurality of beef creatures in a manner to prevent the rupture of red corpuscles, separating the red corpuscular matter from the straw colored plasma, removing fibrin from the plasma, and treating the resultant serum with a solvent of organic fats which solvent is of a character to dissolve out the fatty substances without forming a by-product objectionable from a food standpoint.

2. The method of producing an edible protein product which consists in extracting the blood from a plurality of beef creatures in a manner to prevent the rupture of red corpuscles, separating the red corpuscular matter from the straw colored plasma, removing fibrin from the plasma, treating the resultant serum with a solvent of organic fats of a character to dissolve out the fatty substances without forming a by-product objectionable from a food standpoint, separating the solvent solution from the serum, and concentrating the serum.

3. The method of producing an edible protein product which consists in extracting the blood from a plurality of beef creatures in a manner to prevent the rupture of red corpuscles, separating the red corpuscular matter from the straw colored plasma, removing fibrin from the plasma, treating the resultant serum with a solvent of organic fats of a character to dissolve out the fatty substances without forming a by-product objectionable from a food standpoint, separating the solvent solution from the serum, and distilling the solvent solution at a temperature to recover the solvent for further use.

4. The method of producing an edible protein product which consists in extracting the blood from a plurality of beef creatures, separating the red corpuscular matter from the straw colored plasma, removing fibrin from the plasma, and treating the resultant serum with carbon tetrachloride to dissolve out the fatty substances.

5. The method of producing an edible protein product which consists in extracting the blood from a plurality of beef creatures in a manner to prevent the rupture of red corpuscles, separating the red corpuscular matter from the straw colored plasma, removing fibrin from the plasma, and treating the resultant serum at approximately body temperature with carbon tetrachloride to dissolve out the fatty substances.

6. The method of producing an edible protein product which consists in extracting the blood from a plurality of beef creatures in a manner to prevent the rupture of red corpuscles, separating the red corpuscular matter from the straw colored plasma, removing fibrin from the plasma, treating the resultant serum with carbon tetrachloride to dissolve out the fatty substances, separating the carbon tetrachloride solution from the serum by gravity, withdrawing the solution from the serum, and thereafter recovering the carbon tetrachloride.

7. The method of producing an edible protein product which consists in extracting the blood from a plurality of beef creatures in a manner to prevent the rupture of red corpuscles, separating the red corpuscular matter from the straw colored plasma, removing fibrin from the plasma, treating the resultant serum with carbon tetrachloride to dissolve out fatty substances, separating the carbon tetrachloride solution from the serum, and drying the serum.

8. That step in the method of producing an edible protein product which consists in treating blood serum substantially free from fibrin and red corpuscular matter with a solvent of organic fats of a character to dissolve out fatty substances and traces of fibrin, if present without forming a by-product objectionable from a food standpoint, and separating the solvent solution from the serum.

9. That step in the method of producing an edible protein product which consists in treating blood serum substantially free from fibrin and red corpuscular matter with carbon tetrachloride to dissolve out fatty substances, and separating the carbon tetrachloride solution from the serum.

10. That step in the method of producing an edible protein product which consists in treating blood serum substantially free from fibrin and red corpuscular matter with carbon tetrachloride in approximately fifteen to twenty per cent. by weight to completely dissolve out fatty substances and traces of fibrin, if present, and separating the solvent solution from the serum.

In testimony whereof I have signed my name to this specification.

JOHN W. M. BUNKER.